US012409411B2

(12) United States Patent
Kamijo et al.

(10) Patent No.: US 12,409,411 B2
(45) Date of Patent: Sep. 9, 2025

(54) EXHAUST GAS PROCESSING EQUIPMENT AND GAS TURBINE PLANT

(71) Applicants: MITSUBISHI HEAVY INDUSTRIES, LTD., Tokyo (JP); Mitsubishi Heavy Industries Engineering, Ltd., Kanagawa (JP)

(72) Inventors: Takashi Kamijo, Yokohama (JP); Atsushi Tsutsumi, Yokohama (JP); Hiromi Ishii, Yokohama (JP); Takahiro Araya, Yokohama (JP); Tetsuya Tanaka, Yokohama (JP); Kazunori Tsujii, Yokohama (JP); Naoyuki Nagafuchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 418 days.

(21) Appl. No.: 17/786,084

(22) PCT Filed: Nov. 24, 2020

(86) PCT No.: PCT/JP2020/043630
§ 371 (c)(1),
(2) Date: Jun. 16, 2022

(87) PCT Pub. No.: WO2021/131459
PCT Pub. Date: Jul. 1, 2021

(65) Prior Publication Data
US 2023/0021855 A1    Jan. 26, 2023

(30) Foreign Application Priority Data
Dec. 27, 2019   (JP) .................................. 2019-239000

(51) Int. Cl.
*F02C 6/18*        (2006.01)
*B01D 53/18*       (2006.01)
(Continued)

(52) U.S. Cl.
CPC ............ *B01D 53/343* (2013.01); *B01D 53/18* (2013.01); *B01D 53/62* (2013.01); *B01D 53/78* (2013.01);
(Continued)

(58) Field of Classification Search
CPC ... F02C 3/34; F02C 6/18; Y02E 20/14; F01K 23/10; F23J 2215/50; B01D 53/14; B01D 53/18; B01D 53/343
See application file for complete search history.

(56) References Cited

U.S. PATENT DOCUMENTS 4,586,940 A     5/1986   Stubenvoll
2006/0008394 A1  1/2006   Muramoto et al.
(Continued)

FOREIGN PATENT DOCUMENTS

CA      2 769 622      2/2011
CN      103432861      12/2013
(Continued)

OTHER PUBLICATIONS

International Search Report issued Feb. 2, 2021 in International Application No. PCT/JP2020/043630, with English Translation.
(Continued)

*Primary Examiner* — Thomas P Burke
(74) *Attorney, Agent, or Firm* — Wenderoth, Lind & Ponack, L.L.P.

(57) ABSTRACT

This exhaust gas processing equipment is provided with an exhaust line through which exhaust gas discharged from a boiler circulates, a carbon dioxide recovering device for recovering carbon dioxide included in the exhaust gas, and an exhaust gas heating device provided downstream of the carbon dioxide recovering device to heat the exhaust gas. The carbon dioxide recovering device includes a first medium line through which a first medium circulates, and a (Continued)

second medium line through which a second medium higher in temperature than the first medium circulates. The exhaust gas heating device includes a first heating unit for heating the exhaust gas by means of heat exchange with the first medium, and a second heating unit for heating the exhaust gas passing through the first heating unit even more by heat exchange with the second medium.

8 Claims, 3 Drawing Sheets

(51) Int. Cl.
  B01D 53/34 (2006.01)
  B01D 53/62 (2006.01)
  B01D 53/78 (2006.01)
  F02C 3/34 (2006.01)
(52) U.S. Cl.
  CPC ............... F02C 3/34 (2013.01); F02C 6/18 (2013.01); B01D 2258/0283 (2013.01)

(56) References Cited

U.S. PATENT DOCUMENTS

| | | | |
|---|---|---|---|
| 2013/0062883 A1 | 3/2013 | Kaneeda et al. | |
| 2013/0312386 A1* | 11/2013 | Wirsum | F25J 3/04266 60/39.182 |
| 2013/0314397 A1 | 11/2013 | Tanaka | |
| 2014/0366549 A1* | 12/2014 | Wang | F01N 3/085 60/39.182 |
| 2017/0113177 A1* | 4/2017 | Nakagawa | B01D 53/78 |
| 2018/0001254 A1* | 1/2018 | Fujita | B01D 53/1412 |

FOREIGN PATENT DOCUMENTS

| | | | |
|---|---|---|---|
| CN | 107983078 | 5/2018 | |
| CN | 108525503 | 9/2018 | |
| CN | 108654235 | 10/2018 | |
| CN | 109126364 | 1/2019 | |
| CN | 109513320 | 3/2019 | |
| CN | 208990543 | 6/2019 | |
| CN | 110292828 | 10/2019 | |
| CN | 110302637 | 10/2019 | |
| CN | 209501282 | 10/2019 | |
| CN | 209612613 | 11/2019 | |
| CN | 209679757 | 11/2019 | |
| EP | 2 103 339 | 9/2009 | |
| JP | 9-323024 | 12/1997 | |
| JP | 2009-247932 | 10/2009 | |
| JP | 5450540 | 3/2014 | |
| JP | 5468562 | 4/2014 | |
| JP | 2014-212693 | 11/2014 | |
| KR | 10-2010-0107666 | 10/2010 | |
| WO | 2011/011145 | 1/2011 | |
| WO | WO-2012072362 A1 * | 6/2012 | ............ F01K 23/10 |
| WO | 2012/111475 | 8/2012 | |

OTHER PUBLICATIONS

Written Opinion of the International Searching Authority issued Feb. 2, 2021 in International Application No. PCT/JP2020/043630, with English Translation.
Mengyu Wang, "The Analysis of Using MGGH in Flue Gas Desulphurization (FGD) System in Cement Plant", Journal of Geoscience and Environment Protection, vol. 07, No. 10, Jan. 1, 2019 (Jan. 1, 2019), pp. 155-160, XP093113468, ISSN: 2327-4336, DOI:10.4236/gep.2019.710012 Retrieved from the Internet: URL:http://www.scirp.org/journal/doi.aspx?DOI=10.4236/gep.2019.710012>.
Li Feng et al., "Application of absorption heat pump and direct-contact total heat exchanger to advanced-recovery flue-gas waste heat for gas boiler", Science and Technology for the Built Environment, vol. 25, No. 2, Jan. 16, 2019 (Jan. 16, 2019), pp. 149-155, XP93114347, ISSN: 2374-4731, DOI: 10.1080/23744731.2018.1506676.

* cited by examiner

EXHAUST GAS PROCESSING EQUIPMENT AND GAS TURBINE PLANT

TECHNICAL FIELD

The present disclosure relates to exhaust gas processing equipment and a gas turbine plant.

This application claims priority based on Japanese Patent Application No. 2019-239000 filed in Japan on Dec. 27, 2019, and this content is incorporated herein by reference.

BACKGROUND ART

In a power plant using fossil fuels, for example, a gas turbine plant, exhaust gas is generated as a gas turbine operates. The exhaust gas contains carbon dioxide. From the viewpoint of environmental protection, a technique for removing the carbon dioxide from exhaust gas as much as Possible is required. As such a technique, for example, a method described in Patent Document 1 below is known. In the method according to Patent Document 1, carbon dioxide is absorbed and removed by absorption liquid by bringing at least a part of the exhaust gas into contact with the absorption liquid.

Incidentally, depending on an operating state of a plant, the exhaust gas may contain moisture. When such moisture is condensed, white smoke is generated when the exhaust gas is discharged. In addition to spoiling the surrounding landscape, since the exhaust gas is accompanied by nitrogen oxide remaining in a minute amount in the exhaust gas by direct dropping of the exhaust gas in the vicinity of an outlet, white smoke is required to be suppressed. Therefore, in the technique according to Patent Document 1 below, a method is adopted in which a used absorption liquid is heated and regenerated by heat of the exhaust gas, and the exhaust gas is heated by utilizing the heat of the regenerated absorption liquid. As a result, it is said that the moisture in the exhaust gas evaporates, and generation of white smoke can be suppressed.

CITATION LIST

Patent Literature

[PTL 1] Japanese Unexamined Patent Application Publication No. 2009-247932

SUMMARY OF INVENTION

Technical Problem

However, since the heat of the regenerated absorption liquid is limited, there is a possibility that the exhaust gas cannot be sufficiently heated only by using the absorption liquid. Therefore, there is still a possibility that white smoke may occur in a device described in patent document 1.

The present disclosure has been made to solve the above problems, and an object thereof is to provide exhaust gas processing equipment and a gas turbine plant capable of suppressing generation of white smoke.

Solution to Problem

In order to solve the above problems, according to an aspect of the present disclosure, there is provided exhaust gas processing equipment including an exhaust line through which an exhaust gas discharged from a boiler circulates, a carbon dioxide recovery device that is provided on the exhaust line, and that recovers carbon dioxide contained in the exhaust gas, and an exhaust gas heating device that is provided on a downstream side of the carbon dioxide recovery device in the exhaust line, and that heats the exhaust gas, in which the carbon dioxide recovery device includes a first medium line through which a first medium circulates, and a second medium line through which a second medium having a temperature higher than that of the first medium circulates, and the exhaust gas heating device includes a first heating section that heats the exhaust gas by heat exchange with the first medium, and a second heating section that further heats the exhaust gas passing through the first heating section by heat exchange with the second medium.

Advantageous Effects of Invention

According to the exhaust gas processing equipment and the gas turbine plant of the present disclosure, the generation of white smoke can be suppressed.

DESCRIPTION OF EMBODIMENTS

First Embodiment (Configuration of Gas Turbine Plant)

Figure 1:
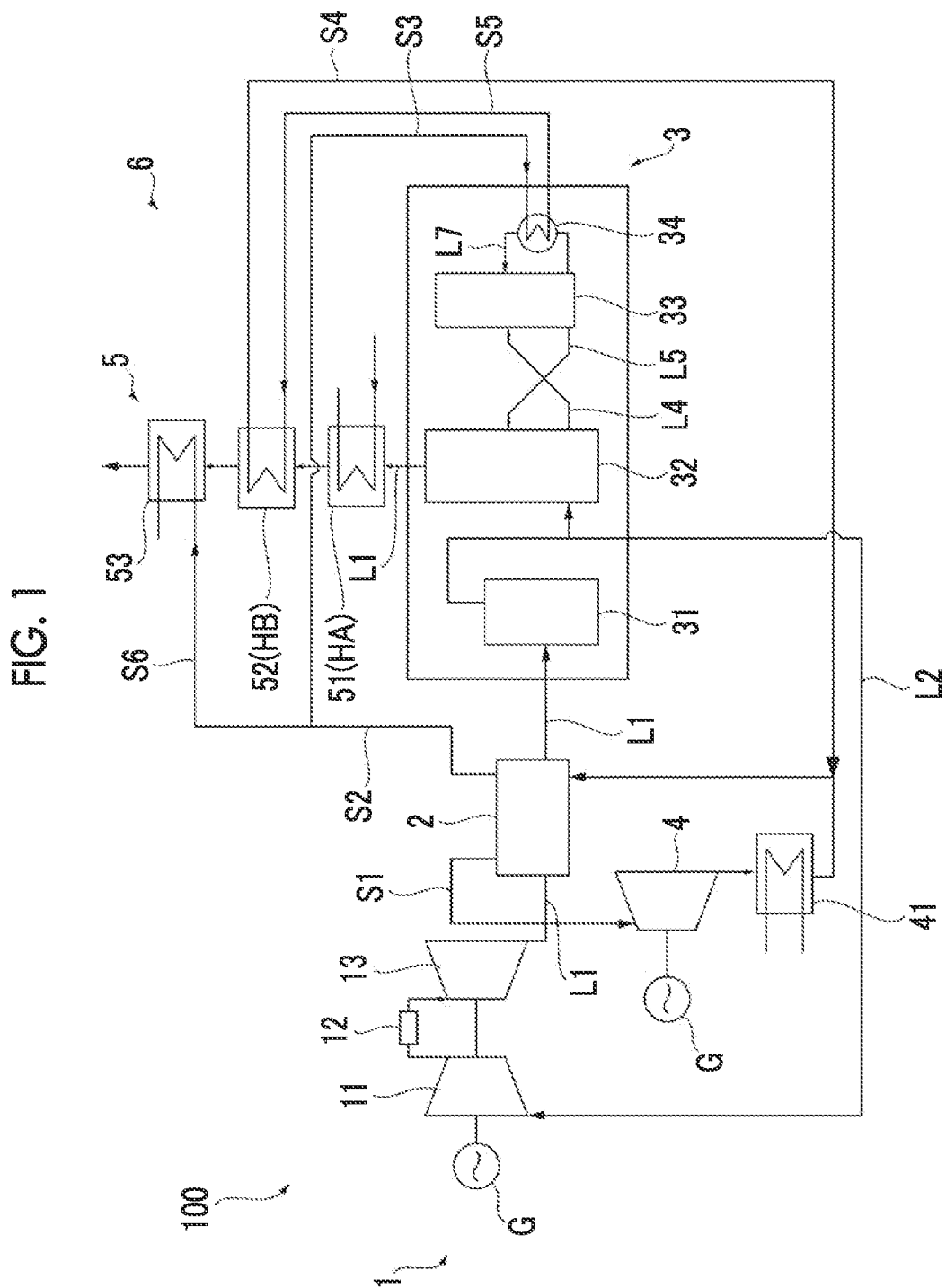
FIG. 1 is a diagram illustrating a configuration of a gas turbine plant according to a first embodiment of the present disclosure.
Figure 2:
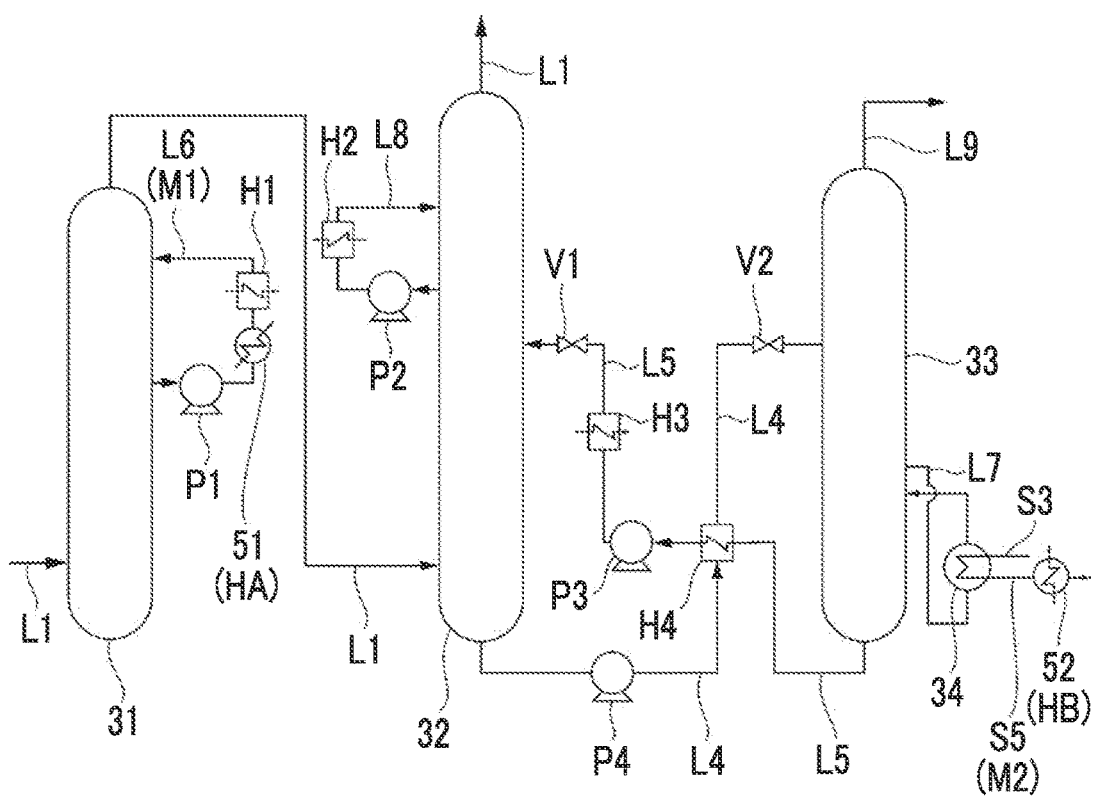
FIG. 2 is a diagram illustrating a configuration of a carbon dioxide recovery device according to the first embodiment of the present disclosure.

Hereinafter, a gas turbine plant 100 according to a first embodiment of the present disclosure will be described with reference to FIGS. 1 and 2. As illustrated in FIG. 1, the gas turbine plant 100 is provided with a gas turbine 1, a heat recovery steam generator 2 (boiler), a steam turbine 4, exhaust gas processing equipment 6, and an EGR line 12.

(Configuration of Gas Turbine)

The gas turbine 1 includes a compressor 11, a combustor 12, and a turbine 13. The compressor 11 compresses outside air to generate high-pressure air. The combustor 12 generates high-temperature and high-pressure combustion gas by mixing fuel with the high-pressure air and combusting the fuel. The turbine 13 is driven by the combustion gas. Rotational energy of the turbine 13 is taken out from a shaft end and utilized for driving, for example, a generator G. The exhaust gas discharged from the turbine 13 is recovered by an exhaust line L1 and sent to the heat recovery steam generator 2.

(Configuration of Heat Recovery Steam Generator)

The heat recovery steam generator 2 generates superheated steam by exchanging heat between the exhaust gas circulating in the exhaust line L1 and water. The superheated steam is sent to the steam turbine 4 through a No. 1. steam line S1 and used to drive the steam turbine 4. The rotational energy of the steam turbine 4 is utilized, for example, to drive the generator G. The steam discharged from the steam turbine 4 is recovered by a condenser 41.

The exhaust gas processing equipment 6 is provided on the exhaust line L1 and on the downstream side of the heat recovery steam generator 2. The exhaust gas processing equipment 6 is provided to keep the exhaust gas circulating in the exhaust line L1 in a clean state and diffuse the exhaust gas to the outside air. The exhaust gas processing equipment 6 includes a carbon dioxide recovery device 3 and an exhaust gas heating device 5.

(Configuration of Carbon Dioxide Recovery Device)

The carbon dioxide recovery device 3 is a device for recovering and removing carbon dioxide contained in the exhaust gas. As illustrated in FIG. 2, the carbon dioxide recovery device 3 includes a quencher 31, an absorber 32, and a regenerator 33.

The quencher 31 is a facility for cooling the exhaust gas circulating through the exhaust line L1 prior to the recovery of the carbon dioxide in the absorber 32 described later. A cooling line 16 is connected to the quencher 31. The cooling line L6 is a flow path in which a part of a heat medium (first medium) circulating inside the quencher 31 is taken out to the outside, cooled by a cooler H1, and then returned to the inside of the quencher 31 again. A pump P1, a first heating section 51 (described later), and the cooler H1 are provided on the cooling line 16. The heat medium, which is high in temperature by heat exchange with the exhaust gas in the quencher 31, is low in temperature through the first heating section 51 and the cooler H1 by the pump P1, and returns to the inside of the quencher 31 again. As will be described in detail later, the first heating section 51 is provided to heat the exhaust gas by exchanging heat between the heat medium (first medium) circulating in the cooling line L6 and the exhaust gas discharged from the carbon dioxide recovery device 3. The exhaust gas cooled by the quencher 31 is sent to the absorber 32 through the exhaust line L1.

The absorber 32 has a cylindrical shape extending in the vertical direction, and the exhaust line L1 extending from the quencher 31 is connected to a lower part thereof. An absorption liquid capable of chemically bonding with the carbon dioxide flows from above to below inside the absorber 32. Specifically, as such an absorption liquid, an aqueous solution of an amine containing monoethanolamine (MEA), diethanolamine (DEA), triethanolamdne (TEA), diisopropanolamine (DIPA), and methyldethanolamine (MDEA), an organic solvent containing no water, a mixture thereof, and an amino acid-based aqueous solution are preferably used. In addition, other than amine may be used as the absorption liquid.

In addition, an absorber cooling line 18 is connected to an upper part of the absorber 32. The absorber cooling line 18 is a flow path in which a part of the heat medium for cooling the exhaust gas in the absorber 32 is taken out to the outside, cooled by a cooler H2, and then returned to the inside of the absorber 32 again. The cooler H2 and a pump P2 are provided on the absorber cooling line 18. The heat medium, which is high in temperature by heat exchange with the exhaust gas in the absorber 32, is sent to the cooler H2 by the pump 92 to be low in temperature, and then is sent to the inside of the absorber 32 again.

The exhaust gas flowed into the lower part of the inside of the absorber 32 rises in the absorber 32 while coming into contact with the absorption liquid flowing from above. At this time, the carbon dioxide contained in the exhaust gas is chemically absorbed by the absorption liquid. The residual exhaust gas from which the carbon dioxide is removed flows into the exhaust line L1 again from the upper part of the absorber 32.

The absorption liquid from which the carbon dioxide is absorbed is sent to the regenerator 33 by a pump P4 through an absorption liquid recovery line L4 connected to the lower part of the absorber 32. The regenerator 33 is a device for regenerating the absorption liquid (separating carbon dioxide) in a state where the carbon dioxide is absorbed. A third steam line S3 through which steam taken out from the heat recovery steam generator 2 described above flows is connected to the regenerator 33. A reboiler 34 is provided on the third steam line S3. Steam from the heat recovery steam generator 2 is supplied to the reboiler 34 through the third steam line S3. In the reboiler 34, a part of the water contained in the absorption liquid is heated by the heat exchange with the steam to be stripping steam. The stripping steam is sent into the regenerator 33 through an absorption liquid extraction line 17. In the regenerator 33, the stripping steam comes into contact with the absorption liquid before regeneration supplied from the absorption liquid recovery line 14. As a result, the carbon dioxide is diffused from the absorption liquid before regeneration, and the absorption liquid is regenerated (state not containing carbon dioxide). The carbon dioxide diffused from the absorption liquid before regeneration is sent to a carbon dioxide compression device (not illustrated) through a carbon dioxide recovery line 19 provided in an upper part of the regenerator 33.

A part of the absorption liquid after regeneration (that is, component that is not stripping steam) is sent to an absorption liquid supply line 15 connected to a lower part of the regenerator 33. A heat exchanger H4, a pump P3, and a cooler H3 are provided on the absorption liquid supply line 15 in this order. By driving the pump 23, the absorption liquid after regeneration is supplied from the regenerator 33 to the heat exchanger H4. In the heat exchanger 1-14, the absorption liquid recovery line 14 and the absorption liquid supply line 15 intersect each other.

As a result, heat exchange is performed between the absorption liquid before regeneration and the absorption liquid after regeneration. The absorption liquid after regeneration passes through the heat exchanger H4 and the cooler H3 to be low in temperature. The absorption liquid after regeneration at a low temperature is supplied to the upper part of the absorber 32. Each of the absorption liquid recovery line 14 and the absorption liquid supply line 15 is provided with valves V1 and V2. By opening, and closing these valves V1 and V2, the open state of these flow paths can be switched.

(Configuration of Exhaust Gas Heating Device)

The exhaust Gas heating device 5 heats the exhaust gas in order to suppress whitening of the exhaust gas discharged from the carbon dioxide recovery device 3 through the exhaust line L1. As illustrated in FIG. 1, the exhaust gas heating device 5 includes a first heating section 51, a second heating section 52, and a third heating section 53.

The first heating section 51 and the second heating section 52 heat the exhaust gas by utilizing the excess heat generated by the carbon dioxide recovery device 3. Specifically, the first heating section 51 is a heat exchanger HA provided on the cooling line 16 (first medium line M1) described with reference to FIG. 2. That is, the exhaust gas is heated by exchanging heat between the heat medium (first medium) used for cooling the exhaust gas in the quencher 31 and the exhaust gas discharged from the carbon dioxide recovery device 3 in the heat exchanger HA. The temperature of the exhaust gas flowing into the first heating section 51 is approximately 30° C. to 35° C. In addition, the temperature of the first medium when heat exchange is performed is, for example, 40° C. to 50° C. As a result, the temperature of the exhaust gas after passing through the first heating section 51 is approximately 40° C. In a case where the above heat exchanger HA is provided, the cooler H1 can be omitted. That is, it is possible to coexist a function of the cooler H1 in the heat exchanger HA.

The second heating section 52 is provided to further heat the exhaust gas heated by the first heating section 51. The second heating section 52 is a heat exchanger HF provided on the downstream side of the reboiler 34 described with reference to FIG. 2 (that is, fifth steam line S5 as a second medium line M2). That is, the exhaust gas is further heated by exchanging heat between the steam as the heat medium (second medium) circulating in the reboiler 34 and the exhaust gas in the heat exchanger HB. The steam discharged from the heat exchanger HB is sent to the heat recovery steam generator 2 through a fourth steam line S4. The temperature of the second medium when heat exchange is performed is, for example, 70° C. to 100° C., which is higher than that of the above-described first medium. As a result, the temperature of the exhaust gas after passing through the second heating section 52 is approximately 65° C.

The third heating section 53 is provided to further heat the exhaust gas heated by the second heating section 52. High-temperature steam, guided from the heat recovery steam generator 2 through a sixth steam line S6 flows into the third heating section 53. By exchanging heat between the steam and the exhaust gas, the exhaust gas is further heated. As a result, the temperature of the exhaust as after passing through the third heating section 53 is approximately 90° C. As a result, the exhaust gas is in a state where white smoke is unlikely to be generated due to the condensation of moisture and is diffused into the outside air.

The EGR line 12 is a pipe for extracting at least a part of the exhaust gas passing through the quencher 31 of the carbon dioxide recovery device 3 and guiding the exhaust as to the compressor 11 of the gas turbine 1.

(Action Effect)

According to the above configuration, the exhaust gas discharged from the carbon dioxide recovery device 3 can be heated by the first medium circulating through the cooling line L6 (first medium line) of the carbon dioxide recovery device 3 and the second medium having a temperature higher than that of the first medium circulating through the fifth steam line S5 (second medium line). As a result, it is possible to suppress the generation of white smoke when the exhaust gas is diffused into the atmosphere. That is, in the above configuration, the excess heat generated by the carbon dioxide recovery device 3 can be utilized for heating the exhaust gas. Furthermore, since the exhaust gas can be heated in two stages by the first medium and the second medium having a temperature higher than that of the first medium, the exhaust gas can be heated more strongly than the configuration in which heating is performed by only one of these media. As a result, the generation of white smoke can be further suppressed.

According to the above configuration, by utilizing the heat taken by the heat medium when the exhaust gas in the quencher 31 is cooled, the heat exchanger HA as the first heating section 51 can heat the exhaust gas discharged from the carbon dioxide recovery device 3. As a result, the heat can be effectively utilized as compared with the configuration in which the exhaust gas is heated by using, for example, another heat source. Furthermore, since another heat medium is used as the first medium instead of the absorption liquid, it is possible to suppress the influence on the environment in a case where the absorption liquid leaks, for example.

According to the above configuration, by utilizing the heat of the second medium used for the regeneration of the absorption liquid in the regenerator 33, the heat exchanger HB as the second heating section 52 can further heat the exhaust gas heated by the first heating section 51. As a result, the heat can be effectively utilized as compared with the configuration in which the exhaust gas is heated by using, for example, another heat source.

According to the above configuration, the exhaust gas can be further heated by the third heating section 53 by the heat of the steam generated by the heat recovery steam generator 2. As a result, the possibility of generation of white smoke can be further reduced.

According to the above configuration, by supplying a part of the exhaust gas to the gas turbine 1 again through the EGR line 12, the exhaust gas can be concentrated and the carbon dioxide concentration can be increased. As a result, the carbon dioxide can be recovered more efficiently by the carbon dioxide recovery device 3.

Second Embodiment

Figure 3:
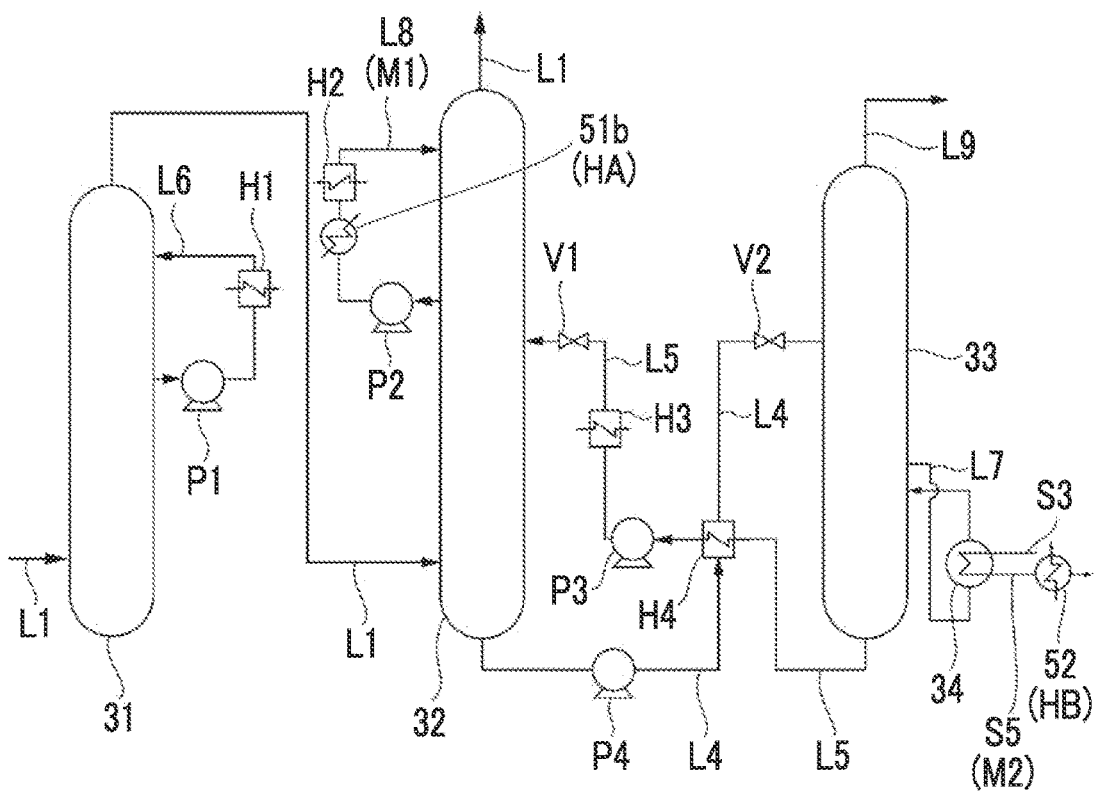
FIG. 3 is a diagram illustrating a configuration of a carbon dioxide recovery device according to a second embodiment of the present disclosure.

Next, a second embodiment of the present disclosure will be described with reference to FIG. 3. The same components as those in the first embodiment are designated by the same reference numerals, and detailed description thereof will be omitted. As illustrated in the figure, in the present embodiment, the configuration of the first heating section 51b in the exhaust gas heating device 5 is different from that of the first embodiment. The first heating section 51b according to the present embodiment is a heat exchanger HA provided between the pump P2 and the cooler H2 on the absorber cooling line L8 of the absorber 32. In a case where the above heat exchanger HA is provided, the cooler H2 can be omitted. That is, it is possible to coexist the function of the cooler H2 in the heat exchanger HA.

According to the above configuration, by utilizing the heat taken by the heat medium, when the exhaust gas in the absorber 32 is cooled, the heat exchanger HA as the first heating section 51b can heat the exhaust gas discharged from the carbon dioxide recovery device 3. As a result, the heat can be effectively utilized as compared with the configuration in which the exhaust gas is heated by using, for example, another heat source. Furthermore, since another heat medium is used as the first medium instead of the absorption liquid, it is possible to suppress the influence on the environment in a case where the absorption liquid leaks, for example.

Third Embodiment

Figure 4:
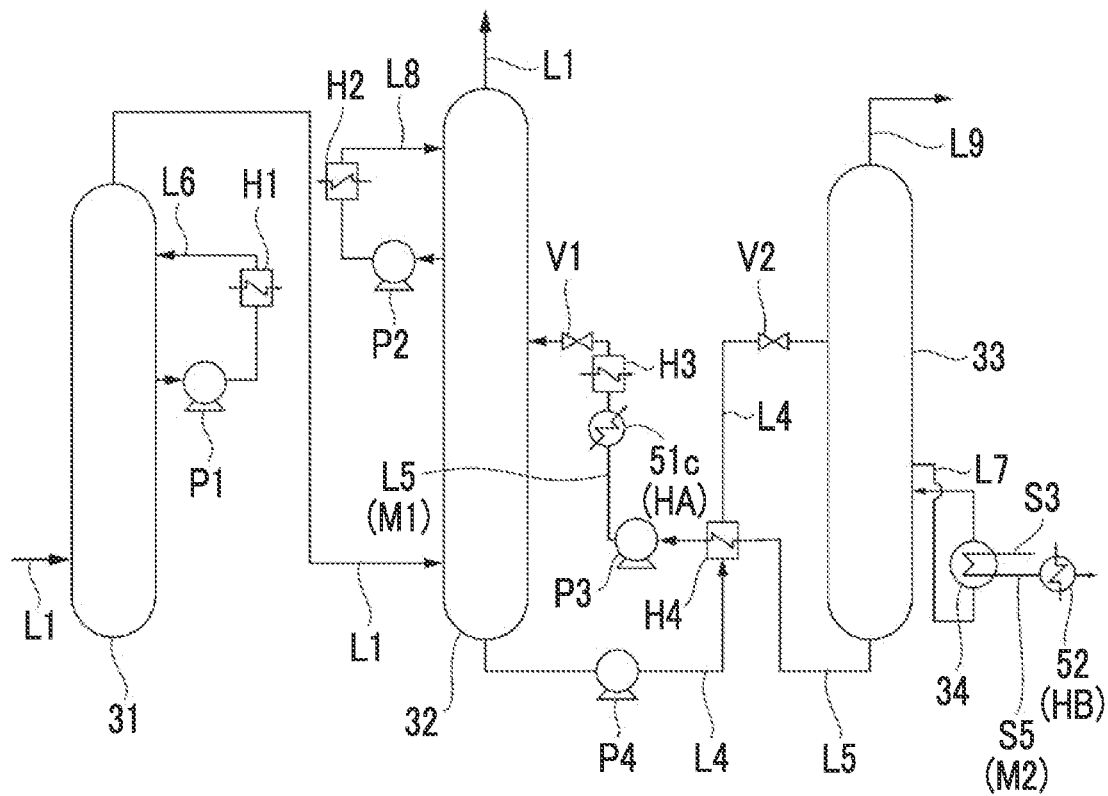
FIG. 4 is a diagram illustrating a configuration of a carbon dioxide recovery device according to a third embodiment of the present disclosure.

Subsequently, a third embodiment of the present disclosure will be described with reference to FIG. 4. The same components as those in each of the embodiments are designated by the same reference numerals, and detailed description thereof will be omitted. As illustrated in the figure, in the present embodiment, the heat exchanger HA as the first heating section 51c is provided on the absorption liquid supply line 15. More specifically, the heat exchanger HA is provided between the pump P3 and the cooler H3 on the absorption liquid supply line L5. In a case where the above heat exchanger HA is provided, the cooler H3 can be omitted. That is, it is possible to coexist the function of the cooler H3 in the heat exchanger HA.

According to the above configuration, by utilizing the heat of the absorption liquid heated by the regeneration of the absorption liquid in the regenerator 33, the exhaust gas can be heated by the heat exchanger HA as the first heating section 51*c*. As a result, the heat can be effectively utilized as compared with the configuration in which the exhaust gas is heated by using, for example, another heat source.

Fourth Embodiment

Figure 5:
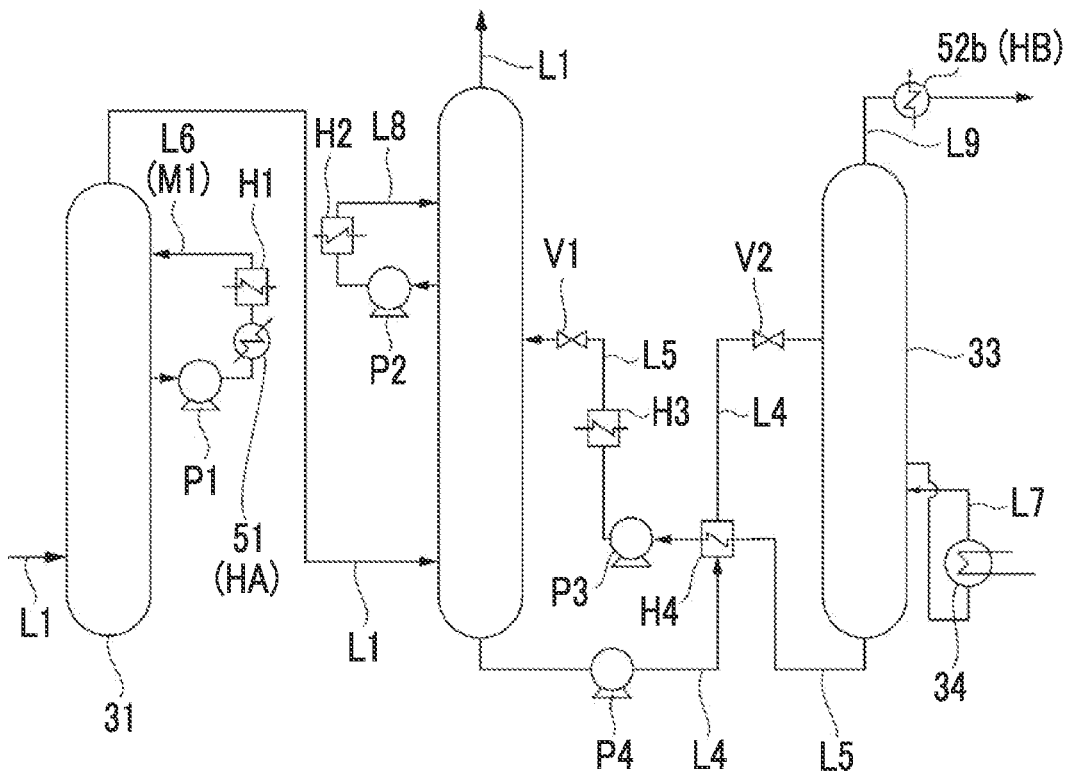
FIG. 5 is a diagram illustrating a configuration of a carbon dioxide recovery device according to a fourth embodiment of the present disclosure.

Next, a fourth embodiment of the present disclosure will be described with reference to FIG. 5. The same components as those in each of the embodiments are designated by the same reference numerals, and detailed description thereof will be omitted. As illustrated in the figure, in the present embodiment, the configuration of the first heating section 51 is the same as that of the first embodiment, while the configuration of the heat exchanger HB as the second heating section 52*b* is different. In the present embodiment, the heat exchanger HB is provided on the carbon dioxide recovery line L9 extending from the upper part of the regenerator 33.

According to the above configuration, by utilizing the heat of the carbon dioxide discharged from the regenerator 33, the heat exchanger HB as the second heating section 52 can heat the exhaust gas heated by the first heating section 51. As a result, the heat can be effectively utilized as compared with the configuration in which the exhaust gas is heated by using, for example, another heat source.

Other Embodiments

Although the embodiments of the present disclosure have been described in detail with reference to the drawings, the specific configuration is not limited to the present embodiment and includes design changes and the like within a range not deviating from the gist of the present disclosure. For example, the configuration of the second heating section 52*b* described in the fourth embodiment can be combined with the first heating sections 51*b* and 51*c* of the second embodiment and the third embodiment.

APPENDIX

The exhaust gas processing equipment and the gas turbine plant described in each embodiment are grasped as follows, for example.

(1) The exhaust gas processing equipment 6 according to a first aspect includes the exhaust line L1 through which the exhaust gas discharged from the boiler (heat recovery steam generator 2) circulates, the carbon dioxide recovery device 3 that is provided on the exhaust line L1, and that recovers the carbon dioxide contained in the exhaust gas, and the exhaust gas heating device 5 that is provided on the downstream side of the carbon dioxide recovery device 3 in the exhaust line L1, and that heats the exhaust gas, in which the carbon dioxide recovery device 3 includes the first medium line through which the first medium circulates, and the second medium line through which the second medium having the temperature higher than that of the first medium circulates, and the exhaust gas heating device 5 includes the first heating section 51 that heats the exhaust gas by heat exchange with the first medium, and the second heating section that further heats the exhaust gas passing through the first heating section 51 by heat exchange with the second medium.

According to the above configuration, the exhaust gas can be heated by the first medium line of the carbon dioxide recovery device 3, the first medium circulating through the second medium line, and the second medium. As a result, it is possible to suppress the generation of white smoke when the exhaust gas is diffused into the atmosphere. That is, in the above configuration, the excess heat generated by the carbon dioxide recovery device 3 can be utilized for heating the exhaust gas. Furthermore, since the exhaust gas can be heated in two stages by the first medium and the second medium, the exhaust gas can be heated more strongly than the configuration in which heating is performed by only one of these media. As a result, the generation of white smoke can be further suppressed.

(2) In the exhaust gas processing equipment 6 according to a second aspect, the carbon dioxide recovery device 3 includes the absorber 32 through which the absorption liquid chemically absorbing the carbon dioxide in the exhaust gas by coming into contact with the exhaust gas circulates, and the absorber cooling line L8 provided in the absorber 32, and serving as the first medium line through which the heat medium as the first medium cooling the exhaust gas by exchanging heat with the exhaust gas in the absorber 32 circulates, and the exhaust gas heating device 5 includes the heat exchanger HA provided on the absorber cooling line 18, and serving as the first heating section 51*b* exchanging heat between the first medium and the exhaust gas.

According to the above configuration, the exhaust gas can be heated by the heat exchanger HA as the first heating section 51 by utilizing the heat taken when the exhaust gas in the absorber 32 is cooled. As a result, the heat can be effectively utilized as compared with the configuration in which the exhaust gas as is heated by using, for example, another heat source. Furthermore, since another heat medium is used as the first medium instead of the absorption liquid, it is possible to suppress the influence on the environment in a case where the absorption liquid leaks, for example.

(3) In the exhaust gas processing equipment 6 according to a third aspect, the carbon dioxide recovery device 3 further includes the absorber 32 through which the absorption liquid chemically absorbing the carbon dioxide in the exhaust gas by coming into contact with the exhaust gas circulates, the regenerator 33 that regenerates the absorption liquid by heating the absorption liquid chemically absorbing the carbon dioxide in the absorber 32, and the absorption liquid supply line L5 serving as the first medium line that supplies the absorption liquid regenerated in the regenerator 33 to the absorber 32, and the exhaust gas heat in device 5 includes the heat exchanger HA provided on the absorption liquid supply line L5, and serving as the first heating section 51*c* that heats the exhaust gas by exchanging heat between the absorption liquid as the first medium and the exhaust gas.

According to the above configuration, the exhaust gas can be heated by the heat exchanger HA as the first heating section 51*c* by utilizing the heat of the absorption liquid heated by the regeneration. As a result, the heat can be effectively utilized as compared with the configuration in which the exhaust gas is heated by using, for example, another heat source.

(4) In the exhaust gas processing equipment 6 according to a fourth aspect, the carbon dioxide recovery device 3 further includes the absorber 32 through which the absorption liquid chemically absorbing the carbon dioxide in the exhaust gas by coming into contact with the exhaust gas circulates, the regenerator 33 that regenerates the absorption liquid by heating the absorption liquid chemically absorbing the carbon dioxide in the absorber 32, the quencher 31 that is provided on the upstream side from the absorber 32 in the exhaust line L1, and that cools the exhaust gas by exchanging heat between the heat medium as the first medium and the exhaust gas, and the cooling line L6 serving as the first medium line through which a part of the first medium taken out from the quencher 31 circulates, and the exhaust gas heating device 5 includes the heat exchanger HA provided on the cooling line L6, and serving as the first heating section 51 that heats the exhaust gas by exchanging heat between the heat medium and the exhaust gas.

According to the above configuration, the exhaust gas can be heated by the heat exchanger HA as the first heating section 51 by utilizing the heat taken when the exhaust gas in the quencher 31 is cooled. As a result, the heat can be effectively utilized as compared with the configuration in which the exhaust gas is heated by using, for example, another heat source. Furthermore, since another heat medium is used as the first medium instead of the absorption liquid, it is possible to suppress the influence on the environment in a case where the absorption liquid leaks, for example.

(5) In the exhaust gas processing equipment 6 according to a fifth aspect, the carbon dioxide recovery device 3 further includes the absorber 32 through which the absorption liquid chemically absorbing the carbon dioxide in the exhaust gas by coming into contact with the exhaust gas circulates, the regenerator 33 through which the absorption liquid chemically absorbing the carbon dioxide in the absorber 32 circulates, the absorption liquid extraction line 17 that extracts the absorption liquid in the regenerator 33, and the reboiler 34 that is provided on the absorption liquid extraction line 17, and that heats and regenerates the absorption liquid by exchanging heat between the absorption liquid and the second medium, and the exhaust gas heating device 5 includes the heat exchanger HB connected to the reboiler 34, and serving as the second heating section 52 that heats the exhaust gas by exchanging heat between the second medium and the exhaust gas.

According to the above configuration, the exhaust gas can be heated by the heat exchanger HB as the second heating section 52 by utilizing the heat of the second medium used for the regeneration of the absorption liquid. As a result, the heat can be effectively utilized as compared with the configuration in which the exhaust gas is heated by using, for example, another heat source.

(6) In the exhaust gas processing equipment 6 according to a sixth aspect, the carbon dioxide recovery device 3 includes the absorber 32 through which the absorption liquid chemically absorbing the carbon dioxide in the exhaust gas by coming into contact with the exhaust gas circulates, and the regenerator 33 that heats and regenerates the absorption liquid by exchanging heat between the absorption liquid chemically absorbing the carbon dioxide in the absorber 32 and the heat medium as the second medium, and the exhaust gas heating device 5 includes the heat exchanger HB serving as the second heating section 52b that heats the exhaust gas by exchanging heat between the carbon dioxide discharged from the regenerator 33 and the exhaust gas.

According to the above configuration, the exhaust gas can be heated by the heat exchanger HP as the second heating section. 52 by utilizing the heat of the carbon dioxide discharged from the regenerator 33. As a result, the heat can be effectively utilized as compared with the configuration in which the exhaust gas is heated by using, for example, another heat source.

(7) In the exhaust gas processing equipment 6 according to a seventh aspect, the exhaust gas heating device 5 further includes the third heating section 53 that further heats the exhaust gas by exchanging heat between a part of steam generated by the boiler (heat recovery steam generator 2) and the exhaust gas passing through the second heating section 52.

According to the above configuration, the exhaust gas can be further heated by the heat of the steam generated in the boiler (heat recovery steam generator 2). As a result, the possibility of generation of white smoke can be further reduced.

(8) The gas turbine plant 100 according to the eighth aspect includes the exhaust gas processing equipment 6 according to the fourth aspect, the gas turbine 1, the boiler (heat recovery steam generator 2) that generates steam by utilizing heat of the exhaust gas from the gas turbine 1, and the EGR line 12 that guides at least a part of the exhaust gas passing through the quencher 31 to the gas turbine 1.

According to the above configuration, by supplying a part of the exhaust gas to the gas turbine 1 again through the EGR line 12, the exhaust gas can be concentrated and the carbon dioxide concentration can be increased. As a result, the carbon dioxide can be recovered more efficiently by the carbon dioxide recovery device 3.

INDUSTRIAL APPLICABILITY

According to an aspect of the present invention, the generation of white smoke can be suppressed.

REFERENCE SIGNS LIST 100 gas turbine plant
1 gas turbine
2 heat recovery steam generator
3 carbon dioxide recovery device
4 steam turbine
5 exhaust gas heating device
6 exhaust gas processing equipment
11 compressor
12 combustor
13 turbine
31 quencher
32 absorber
33 regenerator
34 reboiler
51, 51b, 51c first heating section
52, 52b second heating section
53 third heating section
G generator
H1, H2, H3, H4 cooler
HA, HB heat exchanger
L1 exhaust line
L2 EGR line
L4 absorption liquid recovery line
L5 absorption liquid supply line
L6 cooling line
L7 absorption liquid extraction line
L8 absorber cooling line
L9 carbon dioxide recovery line
P1, P2, P3, P4 pump
S1 No. 1 steam line
S2 second steam line S3 third steam line
S4 fourth steam line
S5 fifth steam line
S6 sixth steam line

The invention claimed is:

1. Exhaust gas processing equipment comprising:
an exhaust line through which an exhaust gas discharged from a boiler circulates;
a carbon dioxide recovery device that is provided on the exhaust line, and that recovers carbon dioxide contained in the exhaust gas; and
an exhaust gas heating device that is provided on a downstream side of the carbon dioxide recovery device in the exhaust line, and that heats the exhaust gas,
wherein the carbon dioxide recovery device includes
a first medium line through which a first medium circulates,
a second medium line through which a second medium having a temperature higher than that of the first medium circulates,
an absorber through which an absorption liquid chemically absorbing the carbon dioxide in the exhaust gas by coming into contact with the exhaust gas circulates, and
an absorber cooling line provided in the absorber, and serving as the first medium line through which a heat medium as the first medium cooling the exhaust gas by exchanging heat with the exhaust gas in the absorber circulates, and
the exhaust gas heating device includes
a heat exchanger provided on the absorber cooling line, and serving as a first heating section exchanging heat between the first medium and the exhaust gas, and
a second heating section that further heats the exhaust gas passing through the first heating section by heat exchange with the second medium.

2. Exhaust gas processing equipment comprising:
an exhaust line through which an exhaust gas discharged from a boiler circulates;
a carbon dioxide recovery device that is provided on the exhaust line, and that recovers carbon dioxide contained in the exhaust gas; and
an exhaust gas heating device that is provided on a downstream side of the carbon dioxide recovery device in the exhaust line, and that heats the exhaust gas,
wherein the carbon dioxide recovery device includes a first medium line through which a first medium circulates,
a second medium line through which a second medium having a temperature higher than that of the first medium circulates,
an absorber through which an absorption liquid chemically absorbing the carbon dioxide in the exhaust gas by coming into contact with the exhaust gas circulates,
a regenerator that regenerates the absorption liquid by heating the absorption liquid chemically absorbing the carbon dioxide in the absorber, and
an absorption liquid supply line serving as the first medium line that supplies the absorption liquid regenerated in the regenerator to the absorber, and
the exhaust gas heating device includes
a heat exchanger provided on the absorption liquid supply line, and serving as a first heating section that heats the exhaust gas by exchanging heat between the absorption liquid as the first medium and the exhaust gas, and
a second heating section that further heats the exhaust gas passing through the first heating section by heat exchange with the second medium.

3. The exhaust gas processing equipment according to claim 1,
wherein the carbon dioxide recovery device further includes,
a regenerator through which the absorption liquid chemically absorbing the carbon dioxide in the absorber circulates,
an absorption liquid extraction line that extracts the absorption liquid in the regenerator, and
a reboiler that is provided on the absorption liquid extraction line, and that heats and regenerates the absorption liquid by exchanging heat between the absorption liquid and the second medium, and
the exhaust gas heating device includes
a heat exchanger connected to the reboiler, and serving as the second heating section that heats the exhaust gas by exchanging heat between the second medium and the exhaust gas.

4. The exhaust gas processing equipment according to claim 2,
wherein the carbon dioxide recovery device further includes
an absorption liquid extraction line that extracts the absorption liquid in the regenerator, and
a reboiler that is provided on the absorption liquid extraction line, and that heats and regenerates the absorption liquid by exchanging heat between the absorption liquid and the second medium, and
the exhaust gas heating device includes
a heat exchanger connected to the reboiler, and serving as the second heating section that heats the exhaust gas by exchanging heat between the second medium and the exhaust gas.

5. The exhaust gas processing equipment according to claim 1,
wherein the carbon dioxide recovery device includes
a regenerator that heats and regenerates the absorption liquid by exchanging heat between the absorption liquid chemically absorbing the carbon dioxide in the absorber and a heat medium as the second medium, and
the exhaust gas heating device includes a heat exchanger serving as the second heating section that heats the exhaust gas by exchanging heat between the carbon dioxide discharged from the regenerator and the exhaust gas.

6. The exhaust gas processing equipment according to claim 2,
wherein
the exhaust gas heating device includes a heat exchanger serving as the second heating section that heats the exhaust gas by exchanging heat between the carbon dioxide discharged from the regenerator and the exhaust gas.

7. The exhaust gas processing equipment according to claim 1,
wherein the exhaust gas heating device further includes a third heating section that further heats the exhaust gas by exchanging heat between a part of steam generated by the boiler and the exhaust gas passing through the second heating section.

8. The exhaust gas processing equipment according to claim 2,
wherein the exhaust gas heating device further includes a third heating section that further heats the exhaust gas by exchanging heat between a part of steam generated by the boiler and the exhaust gas passing through the second heating section.

\* \* \* \* \*